United States Patent [19]
Gonzalez et al.

[11] Patent Number: 6,019,510
[45] Date of Patent: Feb. 1, 2000

[54] CHILD'S CAR SEAT CARRIER POUCH

[75] Inventors: Theresa C. Gonzalez, 36 Margerie Dr., New Fairfield, Conn. 06812; James F. Gonzalez, New Fairfield, Conn.

[73] Assignee: Theresa C. Gonzalez, New Fairfield, Conn.

[21] Appl. No.: 09/223,526

[22] Filed: Dec. 30, 1998

Related U.S. Application Data

[60] Provisional application No. 60/076,997, Mar. 5, 1998.

[51] Int. Cl.⁷ ............................. B65D 33/14; B65D 33/22
[52] U.S. Cl. ............................... 383/22; 383/38; 224/409
[58] Field of Search .................. 383/22, 38; 224/275, 224/563, 572, 409, 42.11

[56] References Cited

U.S. PATENT DOCUMENTS

| | | | |
|---|---|---|---|
| 2,290,099 | 7/1942 | Gill | 224/42.11 |
| 2,953,288 | 9/1960 | Peterson | 224/275 X |
| 2,979,098 | 4/1961 | Greaves | 224/275 |
| 3,014,759 | 12/1961 | Bing | 224/563 X |
| 3,268,133 | 8/1966 | McAnallen | 224/572 X |
| 3,295,887 | 1/1967 | Bacon | 224/275 X |
| 3,717,188 | 2/1973 | Green | 224/563 X |
| 4,955,516 | 9/1990 | Satterfield | 383/38 X |
| 4,974,620 | 12/1990 | Quillan et al. | 383/38 X |
| 5,154,331 | 10/1992 | Sanders | 224/572 X |
| 5,178,310 | 1/1993 | Sowerby | 224/153 |
| 5,941,623 | 8/1999 | Linehan | 224/42.11 X |

*Primary Examiner*—Jes F. Pascua

[57] ABSTRACT

A storage pouch designed to be retrofitted to a child's safety restraining seat. The storage pouch is comprised of two pockets joined by a flexible strap. The strap is set across the seat under the seat cushion and supports the pockets so that the pockets are easily accessible to a child sitting in the safety restraining seat. The length of the flexible strap will be determined by the width of the seat to which it will be retrofitted

7 Claims, 2 Drawing Sheets

SIDE VIEW OF POUCH AS IT HANGS OVER SEAT

4. FLEXIBLE TYPE MATERIAL JOINING TWO POUCHES TOGETHER – GOES UNDER SEAT CUSHION.

3. POUCH FOR TOY/BOOK STORAGE. WILL HANG DOWN ON EACH SIDE OF SEAT AS SHOWN.

2. BASIC CAR SEAT CUSHION:
GOES OVER FLEXIBLE MATERIAL
THAT JOINS POUCHES.

SIDE VIEW OF POUCH AS IT HANGS OVER SEAT.

4. FLEXIBLE TYPE MATERIAL JOINING TWO POUCHES TOGETHER – GOES UNDER SEAT CUSHION.

3. POUCH FOR TOY/BOOK STORAGE. WILL HANG DOWN ON EACH SIDE OF SEAT AS SHOWN.

CHILD'S CAR SEAT CARRIER POUCH

PRIOR REFERENCE

This application claims the benefit of the earlier filed Provisional Application Ser. No. 60/076,997, filed on Mar. 5, 1998.

FIELD OF THE INVENTION

The present invention generally relates to the field of child restraining seats and the like and more particularly is directed to a multi-purpose storage pouch for use with a child's restraining seat to secure small articles close to the seat.

BACKGROUND INFORMATION

Child safety restraining seats for use in motor vehicles are well known in the arts and are taught with various enhancements and features. There remains however a need for an attachment to a child's safety seat to hold secure any of the multitude of small paraphernalia associated with caring for children. When travelling with a child it is often convenient, if not necessary, to bring along feeding bottles, cups, toys, books, wipes, and other articles used in the care and entertainment of the child. It can pose an inconvenience and danger to have said articles loose and falling around the vehicle. Furthermore it is a hazard for a driver or a front seat passenger to lean back and hand articles to a child secured in a child safety seat in the rear of a vehicle. It is therefore useful to have a means for securing these articles in proximity close to the child.

Of the many sizes and shapes relating to children's safety seats, few address concerns with storage, and those that do only address the storage of the seat components themselves.

U.S. Pat. No. 3,912,328 teaches a webbing storage aperture means for receiving and storing the excess webbing of the restraining straps. It does not teach or make allowance for additional storage of items associated with childcare.

U.S. Pat. No. 4,291,915 teaches a storage medium for a child's safety seat combining the concepts of luggage and seat. However U.S. Pat. No. 4,291,915 only stores the seat itself and also does not teach the storage of child care related items.

Fabric utility bags, pouches, saddlebags, pockets and the like are also well known in the arts, and used for many purposes. Duffel bags and pouches are available in a wide variety of sizes and shapes for use in travel, carrying athletic equipment, camping, book bags etc. Saddlebags are commonly used with motor vehicles such as motorcycles, and quad wheeled cycle vehicles. U.S. Pat. No. 4,756,455 even teaches the use of a saddlebag with a watercraft. However none of the prior art teaches a pouch designed to be attached to a child's safety restraining seat.

OBJECTS AND ADVANTAGES

Accordingly, it is the object of my invention to provide a means for storing and securing articles in close proximity to a child's safety restraining seat.

It is a further object of my invention to make this storage means adaptable to many different designs of manufacture for children's safety restraining seats.

Still further it is an object of my invention to have this storage means be removable, and/or transferable to different children's safety restraining seats.

Still further objects and advantages will become apparent from a consideration of the ensuing description and accompanying drawings.

SUMMARY OF THE INVENTION

Figure 1:
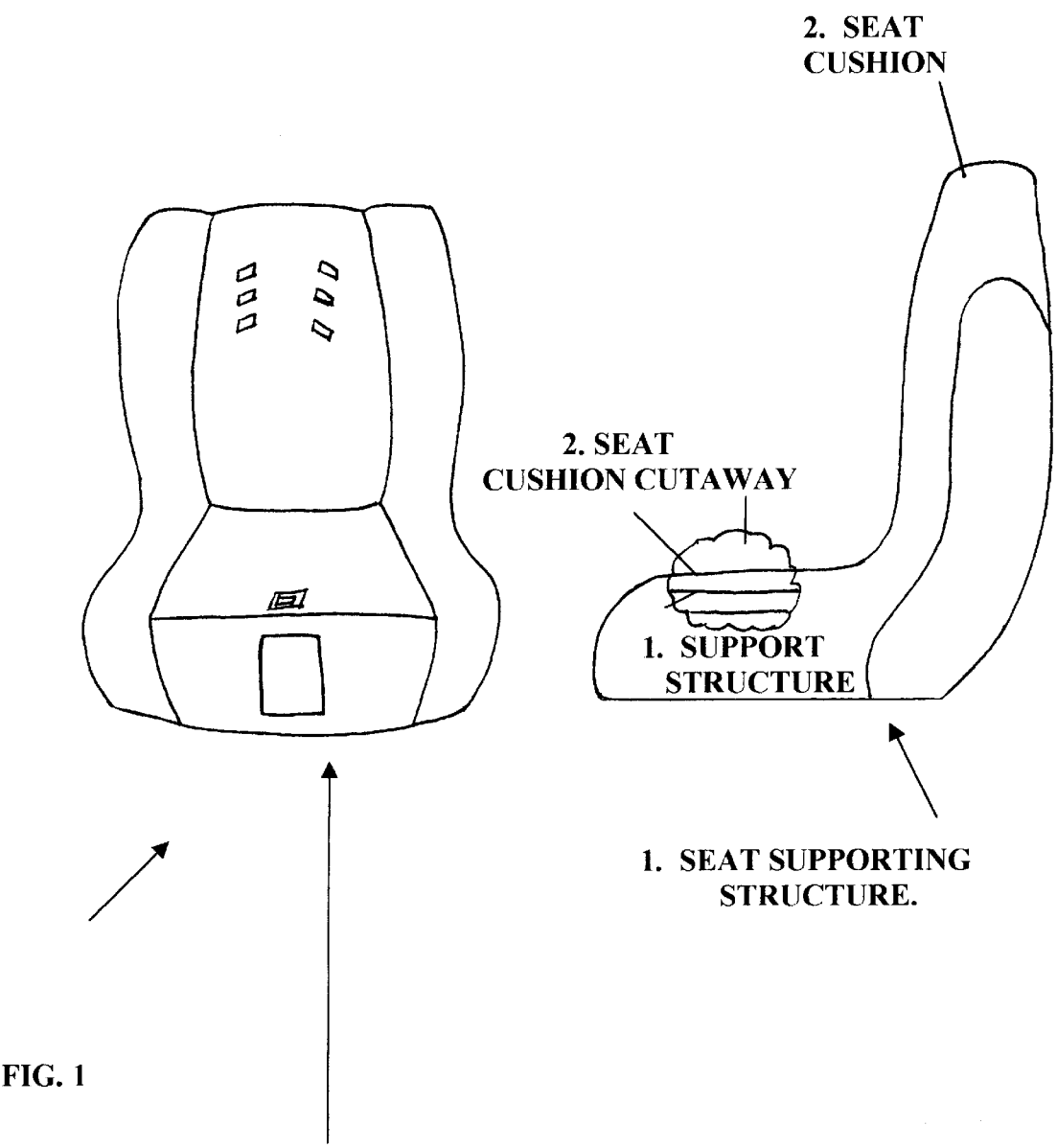
FIG. 1 shows a typical child's safety restraining seat. There is no means with which to secure the miscellaneous paraphernalia, which accompanies the care, and entertaining of a child.
Figure 2:
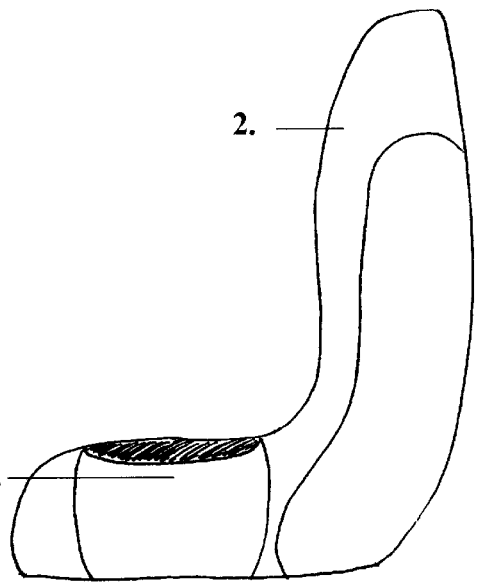
FIG. 2 Shows the (5) car seat carrier pouch secured to a child's safety seat. Pockets for storage (3) are located adjacent to the child's safety seat with a lateral joining strap (4) transversing the seat and securing the pockets close to the seat.
Figure 2:
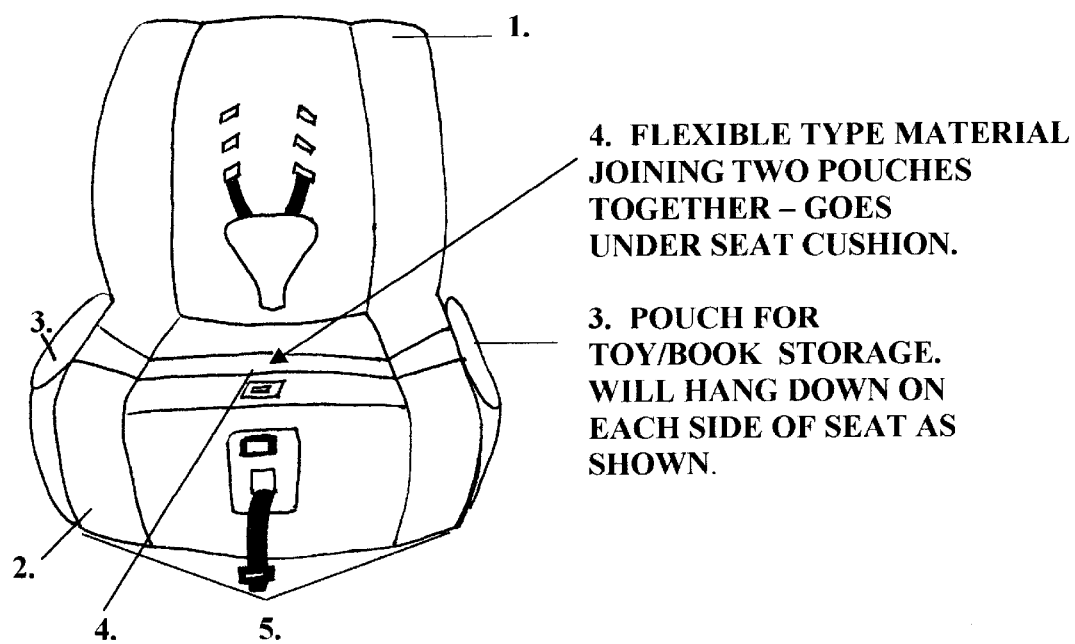

A child's safety seat storage pouch comprising two pockets mounted adjacent to a child's safety seat and joined via a flexible strap located beneath a seat cushion on the safety seat. The flexible strap may be of various lengths to adapt to seat width, and the pockets may be removable via a fastening means such as synthetic material fasteners commonly known by the trademark VELCRO.

DESCRIPTION OF THE PREFERRED EMBODIMENT

The preferred embodiment of this invention is to provide a pouch unit (5) comprising two pockets (3) mounted adjacent to the seat cushion (2) and support structure (1) of a child's safety seat. The preferred mounting means is a flexible strap (4) transversing the seat and located beneath the seat cushion (2). The flexible strap is securely attached to the pockets holding the pockets against each side portion of the seat such that one pocket would be easily accessible to the left hand of a child sitting in the seat, and the other pocket would be easily accessible to the right hand of a child sitting in the seat.

The pockets may be attached by a permanent means such as with a permanent seam sown into the flexible strap and the pocket, or secured with a removable means such as VELCRO, snaps, buttons, or any other well known means for attaching two distinct parts.

The flexible strap should be sized to a length corresponding to the seat width. The correct length strap will hold the pockets up against each side of a child's safety seat. A flexible strap too long will allow the pocket to lie flat next to the child's safety restraining seat out of reach of the child. A strap too short would bulk up the safety seat cushion and be uncomfortable to a child sitting in the seat.

The pocket should be sized to closely match the height and depth of the car seat. A pocket too large will fold if it is fashioned from a flexible material, and therefore become hard to access. A pocket too small will limited in storage capacity, subsequently limiting its usefulness. Pockets may be fashioned from a flexible fabric type of material, or from a rigid material such as plastic or fiberglass and resin.

The pocket may also be fashioned into a receptacle suitable for the storage of a beverage container, juice box, baby bottle, or other beverage dispenser.

CONCLUSIONS

Accordingly, it can be seen that my invention provides a unique and useful means for storing articles close to a child sitting in a child's safety restraining seat.

Although the description above contains many specificities, these should not be construed as limiting the scope of the invention but as merely providing illustrations of some of the presently preferred embodiments of this invention.

Thus the scope of the invention should be determined by the appended claims and their legal equivalents, rather than by the examples given.

I claim:

1. A child's restraining seat storage device comprising:
   a) a first pocket with an upper edge and a lower portion;
   b) a flexible strap securely fastened at one end to the upper edge of the first pocket and at the other end to an upper edge of a second pocket;
   c) a second pocket with an upper edge and a lower portion securely fastened at the upper edge to the end of the flexible strap opposite the first pocket;
   d) said pockets being mounted on opposing sides of a child's safety seat with the flexible strap transversing the seat.

2. The restraining seat storage device according to claim 1 wherein the first and second pockets are attached to the flexible strap in a non permanent manner via a reconnectable fastener.

3. The restraining seat storage device according to claim 2 wherein the reconnectable fastener is selected from the group consisting of: a zipper, a series of buttons, a series of snaps, or synthetic material fasteners.

4. The device of claims 1, 2, or 3 wherein the first and second pockets are made of a fabric material.

5. The device of claims 1, 2, or 3 wherein the first and second pockets are made of a rigid material.

6. The device of claims 1, 2, or 3 wherein the strap has a means for adjusting the length.

7. The device of claims 1, 2, or 3 wherein at least one of the first pocket and second pocket is a receptacle with a closed bottom and an open top, said open top having a oval shape.

* * * * *

UNITED STATES PATENT AND TRADEMARK OFFICE
CERTIFICATE OF CORRECTION

PATENT NO. : 6,019,510
DATED : February 1, 2000
INVENTOR(S) : Theresa C. Gonzalez; James F. Gonzalez It is certified that error appears in the above-identified patent and that said Letters Patent is hereby corrected as shown below:

On the title page, item [75] Inventors: should read as follows:

--[75] Inventors:  Theresa C. Gonzalez, 1 Pinewood Dr.,
New Fairfield, Conn. 06812; James F.
Gonzalez, New Fairfield, Conn.--.

Signed and Sealed this

Twenty-sixth Day of December, 2000

*Attest:*

Q. TODD DICKINSON

*Attesting Officer*  *Director of Patents and Trademarks*